June 20, 1933.  R. TAYLOR  1,914,653
TELEPHONE SYSTEM
Filed Dec. 7, 1931
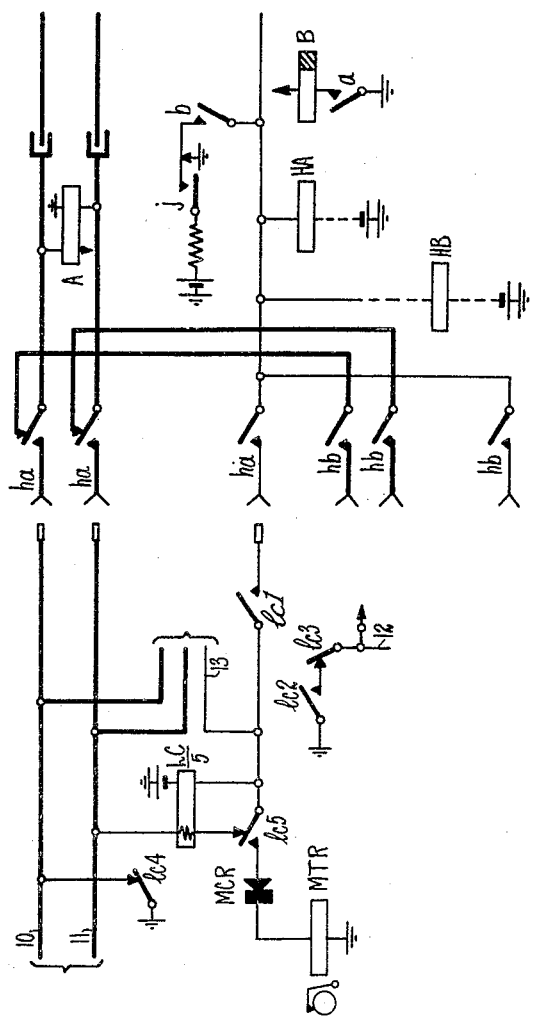
Inventor
Reginald Taylor
Atty.

Patented June 20, 1933

1,914,653

UNITED STATES PATENT OFFICE

REGINALD TAYLOR, OF LIVERPOOL, ENGLAND, ASSIGNOR TO ASSOCIATED TELEPHONE AND TELEGRAPH COMPANY, OF CHICAGO, ILLINOIS, A CORPORATION OF DELAWARE

TELEPHONE SYSTEM

Application filed December 7, 1931, Serial No. 579,394, and in Great Britain December 9, 1930.

The present invention relates to telephone systems and is more particularly concerned with automatic systems in which multiple metering is employed. In certain circumstances, particularly where 200-point finder switches are employed, it is undesirable to employ a special fourth conductor for controlling metering and, in this case, it has been usual practice to make use of a marginally adjusted meter connected to the release trunk conductor and to operate the meter by momentary application of booster battery. In view, however, of the marginal adjustment of the meter and the fact that most electromagnetic devices of this type will hold on a current appreciably smaller than that necessary to effect their operation, difficulties have been experienced in the past in making an arrangement of this type release reliable after it has once been operated so as to permit re-operation in accordance with the particular number of metering impulses required.

The object of the invention is to provide an improved arrangement obviating the need for special marginal adjustment of the meter or any of the co-operative relays.

According to the invention, a rectifier is included in the circuit of the meter in such manner as to prevent current flow through the meter except during the application of booster battery potential and thus ensure the release of the meter when the booster battery potential is removed. This will mean in practice that, if the guarding potential employed is earth, the other terminal of the meter will be connected to earth and, consequently, when booster battery is removed, there can clearly be no current flow through the meter since it is short-circuited.

The invention will be better understood from the following description of one method of carrying it into effect, reference being had to the accompanying drawing. This shows a subscriber's line circuit and part of a finder switch which is of the type arranged to continue hunting in a local circuit until the test wiper encounters battery and is not dependent for its advance on the test wiper finding earth. Such a finder switch is shown and described in British Patent No. 366,143.

Referring now to the drawing, when the subscriber, whose line circuit is shown, desires to originate a call, he will remove his receiver, thereby completing a circuit by way of his instrument and the line conductors 10 and 11 for relay LC in series with a comparatively high non-inductive resistance which is conveniently wound on the core. The current flow is then only sufficient to permit the operation of the light armatures 1c1 and 1c2, the former connecting up battery potential by way of the winding of the relay to mark the corresponding test contact in the finder bank and the latter completing a start circuit over conductor 12 to set in operation a finder switch.

When the switch wipers encounter the contacts of the calling line, relay LC is fully operated in parallel with the switching relay HA or HB in the finder, and at its armature 1c3 opens the finder start circuit, while at armatures 1c4 and 1c5 the calling line is cleared of its normal battery and earth connections and a circuit is prepared for the subscriber's meter MTR which is connected to earth. It should be explained that the metal rectifier MRC included in circuit with the meter MTR is connected up in such sense as to oppose current flow through the meter by way of the windings of the relays LC and HA or HB.

If the call is successful, the meter circuit is brought into operation and at contact J booster battery potential is applied to the release trunk conductor to effect the operation of the calling subscriber's meter. Conveniently, the booster battery may have a potential approximately twice that of the regular exchange battery which effects the normal operation of the controlling relays and the two batteries have opposite poles connected to earth. Consequently, upon the application of booster battery to the release trunk conductor, all the relays which are connected thereto will remain held and the increased potential will cause a current to flow by way of the rectifier MRC to operate the meter MTR. In the case of multiple metering schemes, a plurality of booster battery impulses may be applied to the release trunk conductor at contact *j* in accordance with the particular zone connected with and since the circuit conditions are restored to normal between each application and the meter is short-circuited by the normal holding potential, it will be appreciated that there is no possibility of the meter MTR holding on a reduced current. Moreover, when the holding potential is removed to effect release, there is no possibility of relay LC or relay HA holding up in series with the meter.

In the case of incoming calls, relay LC is fully operated from the connector switch by the application of earth potential to the private normal conductor 13 and, although it will be seen from the circuit that the test contact in the finder bank is again connected up, this will not prejudice the circuit operation since the earth supplied by the connector will prevent the normal battery potential from becoming effective.

What I claim is:

1. In a telephone booster-battery metering system, the combination of a calling subscriber's meter and a rectifier unit connected in series in the telephone circuit in such a manner as to prevent current flowing through said meter except when booster battery is applied to said circuit.

2. In a telephone system in which a calling subscriber's line terminates in the exchange in individual line equipment and in which booster-battery metering impulses are transmitted over the release trunk of a switch-train to said equipment, a meter connected to the release trunk of said equipment, and a current-flow-directing device connected in series with said meter in such a manner as to prevent normal exchange current flowing through the meter and to permit the booster-battery impulses to flow therethrough whenever a call is completed from said line.

3. In a telephone system in which a calling subscriber's line terminates in the exchange in individual line equipment and in which booster battery metering impulses are transmitted to said equipment over the release trunk of a switch employed in the connection completed from said line, a metering circuit comprising a meter and a current-flow-directing device connected in series, and means in said equipment for connecting said metering circuit to said release trunk upon the extension of a call, said device being connected in said circuit in such a manner as to permit only booster-battery current to flow through said meter.

In testimony whereof I affix my signature.

REGINALD TAYLOR.